United States Patent [19]

Seto et al.

[11] Patent Number: 5,210,416

[45] Date of Patent: May 11, 1993

[54] HIGH-SPEED IMAGING STAGE

[75] Inventors: Hisao Seto; Tugio Inoue, both of Kanagawa, Japan

[73] Assignee: Fuji Photo Film Co., Ltd., Kanagawa, Japan

[21] Appl. No.: 739,067

[22] Filed: Aug. 1, 1991

[30] Foreign Application Priority Data

Aug. 2, 1990 [JP] Japan .................................. 2-205581

[51] Int. Cl.5 ...................... G03B 42/00; G03B 42/04
[52] U.S. Cl. .................................. 250/327.2; 378/172
[58] Field of Search ....................... 378/172, 174, 173; 250/327.2 J, 327.2 K

[56] References Cited

U.S. PATENT DOCUMENTS

| 4,104,529 | 8/1978 | Gaudel | 378/172 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,602,157 | 7/1986 | Kayser | 250/327.2 |

FOREIGN PATENT DOCUMENTS

| 114978 | 8/1984 | European Pat. Off. | 250/327.2 |
| 140374 | 5/1985 | European Pat. Off. | 250/327.2 |
| 60-200248 | 10/1985 | Japan . | |

Primary Examiner—Constantine Hannaher
Attorney, Agent, or Firm—Sughrue, Mion, Zinn, Macpeak & Seas

[57] ABSTRACT

The high-speed imaging stage of the present invention contains a holding holding such as a prismatic rotating body or an endless belt that can rotate or move at high speed and that is loaded with a plurality of recording materials such as stimulable phosphor sheets and X-ray film. The holding device transfers the recording materials successively by continuously performing intermittent fast moving operations in such a way that a recording material can rest temporarily in the imaging position beneath an imaging window while holding the recording materials in position, whereby the radiation image of a subject can be recorded on the recording materials. Therefore, this high-speed imaging stage has a simple construction and is capable of performing high-speed and continuous imaging on the recording materials without causing damage to them even if they are not placed within protective cases.

4 Claims, 8 Drawing Sheets

HIGH-SPEED IMAGING STAGE

BACKGROUND OF THE INVENTION

1. Field of the Invention

This invention relates to a high-speed imaging stage that is capable of continuous and high-speed imaging on radiographic recording materials including stimulable phosphor sheets and X-ray films.

2. Prior Art

Radiation imaging has conventionally been accomplished by radiographic systems that use a sensitizing paper in combination with a radiographic film having an emulsion layer that is made of a silver halide light-sensitive material. Recently, a system for recording and reproducing radiation information using stimulable phosphor is drawing increasing attention from researchers as a promising substitute for radiographic systems.

Certain phosphors, when exposed to radiation such as X-rays, $\alpha$-rays, $\beta$-rays, $\gamma$-rays, electron beams and ultraviolet rays, store part of the energy that the radiation possesses. When the phosphor is subsequently exposed to excitation light such as visible light, it produces stimulated emission corresponding to the stored energy. The phosphor exhibiting such properties is known as a stimulable phosphor.

Various systems have been proposed for recording and reproducing radiation images using stimulable phosphor. In those systems, the radiation image of a subject such as the human body is first stored in a sheet having a layer of stimulable phosphor (which is hereinafter referred to simply as a "phosphor sheet") and the sheet is then scanned with excitation light to produce a stimulated emission. The stimulated emission is read with an optical device to obtain electrical image signals, which are subsequently processed to produce a radiation image of the subject that is sharp enough to insure accurate diagnosis (see, example, Japanese Patent Application Kokai Nos. 12429/1980, 11395/1981, 163472/1980, 104645/1981 and 116340/1980).

The phosphor sheet is not intended to store the image information permanently but it is merely used to retain radiation image information temporarily before a final image is formed on a recording medium. Hence, the phosphor sheet may be designed to be used cyclically. This is not only very economical but also convenient.

In order to form radiation image on the phosphor sheet in the radiation image information recording and reproducing system described above, a subject such as the human body and the phosphor sheet are placed in specified positions in the imaging (recording) apparatus and the radiation emitted from a radiation source such as an X-ray source is applied to the phosphor sheet through the subject.

In examining the circulatory system of the human body as well as checking the functions of various organs, a contrast medium is injected into blood vessels and the state of blood circulation is investigated. For accurate diagnosis, the part of interest must be imaged continuously at high speeds of 2–6 pictures per second depending on the speed of blood circulation. To meet this need, various types of high-speed imaging stages that are capable of high-speed continuous imaging and that hence are adapted for imaging the state of blood circulation and other phenomena, have been proposed and commercialized for use with the systems of recording and reproducing radiation image information.

As already mentioned, radiation image information is recorded on the phosphor sheet by illuminating it with radiation through the subject to be imaged. In this case, the time of exposure of the phosphor sheet to radiation, namely, the time required for imaging, is usually very. In order to achieve high-speed continuous imaging at speeds of 2–6 pictures per second, it is important that the phosphor sheet be ejected as soon as possible after imaging and that additional phosphor sheets be supplied to predetermined positions as rapidly as possible.

One of the conventional high-speed imaging stages that have been proposed to meet this requirement is described in commonly assigned Japanese Patent Application Kokai No. 200248/1985. An engaging member is provided both at the position where phosphor sheets are subjected to imaging and at the position where they, are accommodated following ejection after imaging. The phosphor sheets are moved at high speed, either with air or by various mechanical means using an urging member, so that they impinge against the engaging members at the specified positions for supply and ejection. However, in this method, the phosphor sheets are supplied to the specified position at a high speed until they impinge against the engaging member and, therefore, the expensive phosphor sheets are damaged so heavily that they become unsuitable for use in a very short period of time, thereby making it impossible to use them cyclically in the economical manner already mentioned above.

The assignee also proposed in Japanese Patent Application Kokai No. 104936/1985 a method of performing imaging on phosphor sheets that are individually placed within protective cases. However, this method is incapable of rapid diagnostic imaging since it takes time to place the phosphor sheets individually into separate protective cases.

SUMMARY OF THE INVENTION

The present invention has been achieved under these circumstances and has as an object providing a high-speed imaging stage of a simple construction that is capable or performing high-speed and continuous imaging on phosphor sheets and other recording media without causing damage to them even if they are not placed within protective cases.

A first embodiment of the present invention, attains this object by a high-speed imaging stage that has a bed that is provided with an imaging window in a position that corresponds to the imaging site of a subject, so as to admit the passage of radiation that has penetrated through the subject;

a holding device that is loaded with a plurality of recording materials and that holds them in position, the holding device transfers the recording materials successively by continuously performing intermittent fast moving operations in such a way that a recording material can rest temporarily in the imaging position beneath the imaging window while holding the recording materials in position, whereby the radiation image of the subject can be recorded on the recording materials then holding device is also capable of moving at low speed for permitting the recording materials to be detected after imaging;

a supply device for supplying unexposed recording materials to the holding device; and an accommodating device by which the imaged recording materials device are transferred to a receiving container when the holding device is moving at low speed;

the imaging stage is further characterized in that after the necessary number of recording materials are loaded and held by the holding device, the latter repeats intermittent operations at a high speed so as to perform successive imaging on the recording materials and, after the imaging on the necessary number of recording materials ends, the holding device is moved at low speed so that the imaged recording materials are accommodated into the receiving container by the accommodating device.

A second embodiment of the present invention, attains the aforementioned object through a high-speed imaging stage that has:

a bed that is provided with an imaging window in a position that corresponds to the imaging site of a subject, so as to admit the passage of radiation that has penetrated through the subject;

a holding device that is loaded with a plurality of recording materials and that holds them in position, the holding device transfers the recording materials successively by continuously performing intermittent moving operations in such a way that a recording material can rest temporarily in the imaging position beneath the imaging window while holding the recording materials in position, whereby the radiation image of the subject can be recorded on the recording materials;

a supply device for supplying an unexposed recording material to the holding device while the previous recording material rests temporarily in the imaging position; and an accommodating device for accommodating the imaged recording material into a receiving container.

In both preferred embodiments, the holding device is adjustable in distance from the imaging window in such a way that, when imaging is to be performed, the holding device is moved upward to reduce the distance between the recording material to be imaged and the imaging window.

In another preferred embodiment, the holding device is either a prismatic rotating body or an endless belt.

The high-speed imaging stage according to the first embodiment of the present invention is operated in the following manner. First, the necessary number of yet to be imaged recording materials in a magazine or some other suitable supply container, are loaded and held in the holding device at predetermined positions. Thereafter, the holding device is moved of a high speed as required for bringing a particular phosphor sheet to a position where it faces the bed of the imaging stage. Then, radiation is applied to the recording material through the subject so that its image is recorded in the recording material. When the imaging of the first recording material ends, the holding device is again moved at high speed until the second recording material that is supported next to the first imaged recording material in the direction of movement is brought to a position where it faces the bed of the imaging stage. The second recording material rests in that position temporarily while it is subjected to imaging in the same manner as described above. By repeating this procedure, the image of the subject is recorded continuously at high speed in the necessary number of recording materials as they are held by the holding device.

After imaging the necessary number of recording materials in this manner, the holding device is moved at low speed so that the imaged recording materials are ejected therefrom to be accommodated into a receiving container, such as a receiving magazine, by the accommodating device.

In the high-speed imaging stage according to the second embodiment of the present invention, the subject is imaged onto a recording material that is held by the holding device and that is in registry with a position where it faces the bed of the imaging stage; at the same time, another recording material is supplied to the holding device by the supply device and held by the holding device while the recording material that has been imaged is ejected from the holding means and accommodated into a receiving container by the accommodating device. When the imaging of one recording material ends, the holding device is again moved at high speed so that the recording material that is supported next to the imaged recording material in the direction of movement is brought to a position where it faces the bed of the imaging stage. Thereafter, it is imaged while a third recording material is supplied and the first imaged recording material is ejected. By repeating this procedure, the image of the subject is recorded continuously at high speed in a large number of recording materials.

Therefore, by using the high-speed imaging stage of the present invention, high-speed and continuous imaging can be accomplished in an easy and efficient manner without damaging the recording materials even if they are not placed individually within protective cases or the like.

The high-speed imaging stage according to the first embodiment of the present invention has the particular advantage that continuous imaging on a given number of recording materials can be performed in a very fast and easy way. With the high-speed imaging stage according to the second embodiment of the present invention, the imaging time itself is not as short as in the first embodiment but the whole sequence of continuous imaging operations that include the steps of supplying a large number of recording materials from a supply container, setting each recording material in the imaging position, recording the image of a subject and accommodating the imaged recording material into a receiving container can be carried out at high speed and in an easy manner.

DESCRIPTION OF THE PREFERRED EMBODIMENTS

The high-speed imaging stage of the present invention is described below in greater detail with reference to the preferred embodiments shown in the accompanying drawings.

Figure 1:
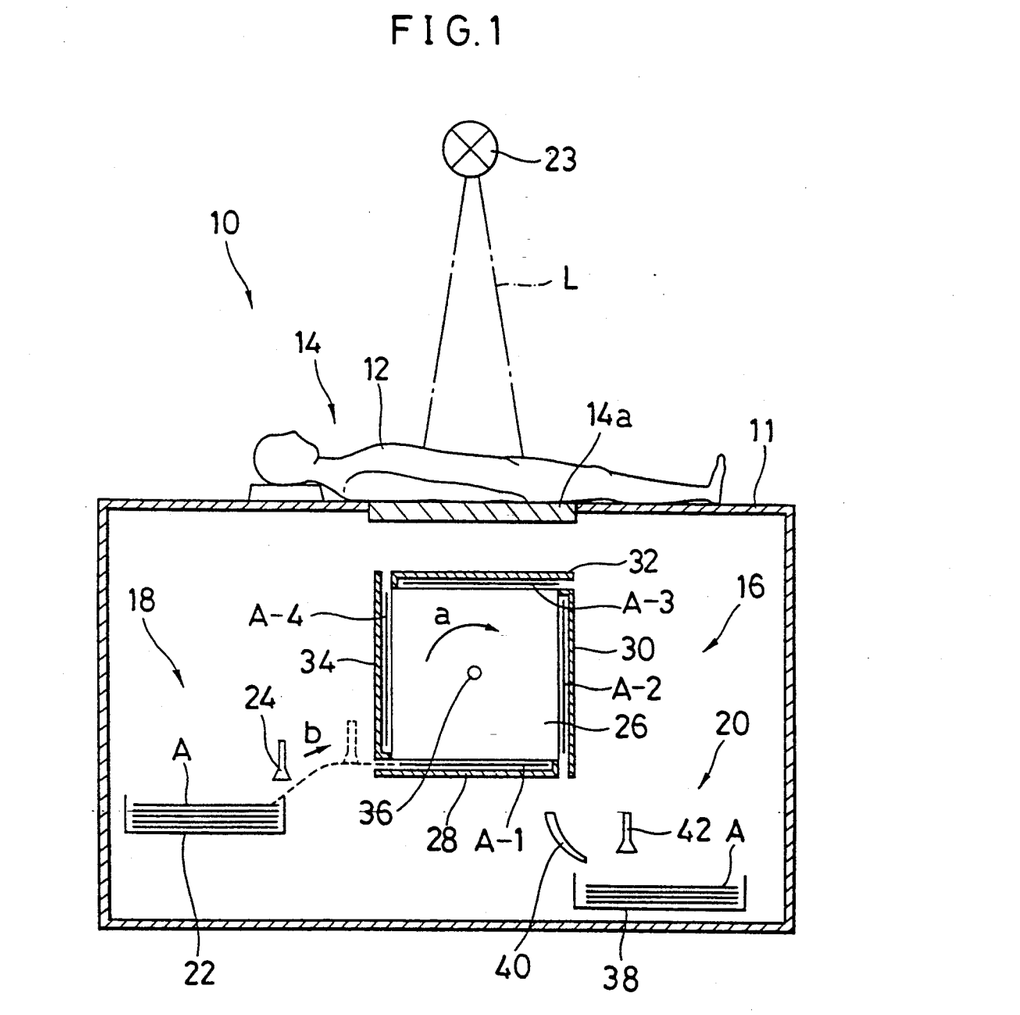
FIG. 1 is a diagrammatic cross-sectional view showing an embodiment of the high-speed imaging stage according to the first aspect of the present invention.

FIG. 1 is a diagrammatic cross-sectional view showing an example of the high-speed imaging stage according to the first aspect of the present invention.

The high-speed imaging stage generally indicated by 10 in FIG. 1 is loaded with up to four stimulable phosphor sheets A (hereafter referred to as "phosphor sheets A") and permits high-speed continuous imaging on those sheets. The imaging stage 10 consists basically of the following components: a bed 14 that is mounted on top of a light-opaque housing 11 and on which a subject (patient) 12 will lie; a holding device 16 that holds up to four phosphor sheets A accommodated within the housing 11 and that is capable of not only rotating at high speed in the direction of arrow a but also stopping as required; a supply device 18 for supplying the phosphor sheets A to the holding device 16; an accommodating device 20 for accommodating the phosphor sheets A after imaging; a drive source (not shown) for driving the holding device 16; and a controller means (also not shown) for controlling its operation. A radiation source 23 is provided above the high-speed imaging stage 10.

The high-speed imaging stage 10 having the basic construction shown in FIG. 1 is operated in the following manner: the subject 12 is allowed to lie on the bed 14 in a predetermined position; phosphor sheets A, typically four in number (A-1 to A-4), are loaded on the holding device 16, which is rotated at high speed through an angle of 90° in the direction of arrow a and then brought to a temporary stop for imaging; by repeating this intermittent operation, the subject 12 is continuously imaged on the four phosphor sheets A at high speed; after all of the loaded phosphor sheets A have been imaged, they are accommodated in an associated receiving container. The operation of the imaging stage 10 will be described more specifically.

The bed 14 provided on top of the housing 11 has an imaging window 14a that is transmissive of radiation. The subject 12 as he lies on the bed 14 adjusts himself so that the site to be imaged will be in the proper position for imaging. The high-speed imaging stage 10 of the present invention is in no way limited as regards the structure of the bed 14 and it may be constructed in entirely the same manner as the bed of conventional radiographic imaging stages.

Radiation L is emitted from the radiation source 23 which is positioned above the bed 14.

The supply device 18 is installed within the housing 11 in the lower left position as viewed in FIG. 1 and it supplies the holding device 16 with yet to be imaged phosphor sheets A in a supply magazine 22 loaded in the imaging stage 10. In the case of the example shown in FIG. 1, the supply device 18 is composed of a sucking member 24 that sucks and transports the phosphor sheets A from the supply magazine 22 and a device (not shown) for moving this sucking member 24. With the supply device 18 being constructed in the manner described above, the sucking member 24 holds the phosphor sheets A by suction and they are supplied to the holding 16 by moving the sucking member 24 in the direction of arrow a.

The sucking member 24 is not limited to any particular type and any known holding device that depends on suction for its operation such as sucking disks may be employed. The device for moving the sucking member 24 may also be of any known type such as a link mechanism.

In the present invention, the supply device 18 also is not limited to the type that uses the sucking member 24 and it may be replaced by any device of holding sheetings. Alternatively, the sucking member 24 may be replaced by transport rollers, a belt conveyor and any other means of transporting sheetings.

The holding device 16 is installed in the center of the housing 11 and is adapted to rotate at high speed in the direction of arrow a so that up to four phosphor sheets A are moved as they are supported by the holding device 16. As shown, the holding device 16 is composed of a rotating body 26 in the form of a square prism, as well as four holding members 28, 30, 32 and 34 that are individually fixed to the four side faces of the rotating body 26.

The rotating body 26 is in the form of a square prism that is capable of rotating at high speed about an axle 36 in the direction of arrow a and stopping within a very short time. As shown, the rotating body 26 is positioned in such a way that one side of it will face parallel to the bed 14.

In the high-speed imaging stage 10 shown in FIG. 1, the rotating body 26 rotates intermittently at high speed by increments of 90° from the initial position, whereby the image of the subject 12 is recorded on the successive phosphor sheets A. After the imaging, the rotating body 26 is rotated at low speed and brought to a stop so that the phosphor sheets A are ejected and accommodated into a receiving container. The movement of the rotating body 26 is controlled by a controller not shown and its operation will be described in greater detail later in this specification.

The material of which the rotating body 26 is formed is not limited to any particular type and various types of resins and metals are usable. However, in order to permit high-speed rotation and abrupt stopping, the rotating body 26 is preferably made of a lightweight material. Further, in order to insure that, during imaging, the phosphor sheets A other than that facing the bed 14 (phosphor sheet A-3 in the case shown) will not be exposed to the radiation L emitted from the radiation source 23, a thin lead plate is attached to the entire part of the outer or inner surfaces of the rotating body 26. If desired, the rotating body 26 itself may be formed of lead.

The rotating body 26 may be rotated by any drive source such as a stepping motor that is capable of high-speed rotation with high precision. The rotating speed of the rotating body 26 is not limited to any particular value and may be determined as appropriate for the specific object of imaging. To take the examination of blood circulation as an example, imaging must be performed at a speed as fast as 2-6 pictures per second and, in this case, the rotating body 26 preferably has the ability to rotate at speeds not slower than 60 rpm.

In order to enable abrupt stop following high-speed rotation, the rotating body 26 is preferably equipped with a brake for stopping its rotation. Various known types of brakes can be adopted as long as they are capable of stopping the rotating body 26 within a very short time.

The rotating body 26 is fitted with holding members 28-34 on the four side faces of the square prism. Each of the holding members 28-34 is an L-shaped plate, with the distal end of the shorter side being fixed to the rotating body 26. In the imaging stage 10, phosphor sheets A-1 to A-4 are inserted into the spaces defined by the rotating body 26 and the holding members 28-34.

Figure 2A:
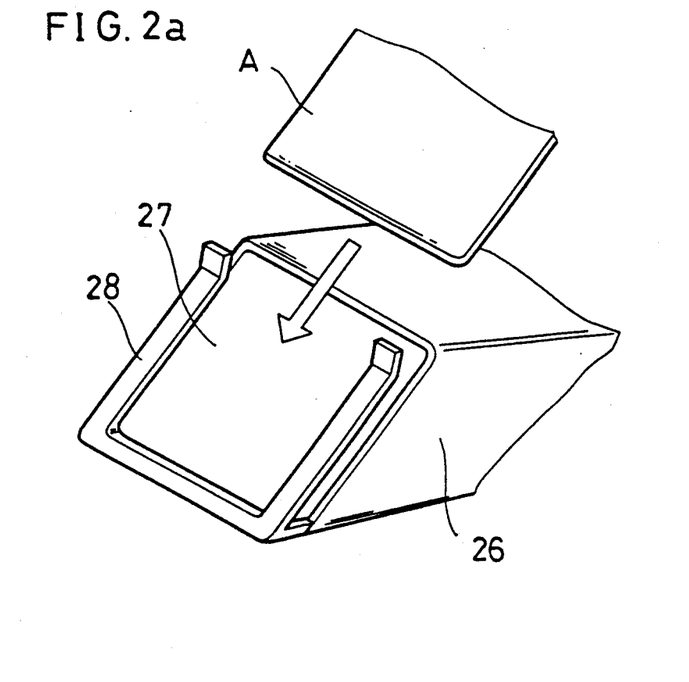
FIG. 2a is a partial perspective view showing an embodiment of the holding member for the holding means of the high-speed imaging stage according to the present invention.

For example, the holding member 28 as shown in FIG. 2a may be composed of a framework. In FIG. 2a, the thin lead plate 27 is attached to the outer surface of the rotating body 26. The phosphor sheet A is inserted in the space between the holding member 28 and the thin lead plate 27, is held in it, and is detached from it.

There is no particular limitation on the constituent material of the holding members 28-34 and they may be formed of various kinds of resins, metals, etc. For Example, the preferable resin is a acetal resin such as Derlin (Du Pont Co.), and the preferable metal is aluminum. However, for the same reason as described in connection with the rotating body 26, the holding members 28-34 are preferably made of a lightweight material. The holding members 28-34 may be formed of the same material as the rotating body 26, or they may be made of different materials. If desired, the holding members 28-34 may be shaped as an integral part of the rotating body 26.

The holding members 28-34 and/or the rotating body 26 may be equipped with a device for fixing the phosphor sheets A so that they are firmly held on the rotating body 26. There is no particular limitation on the fixing device and various known methods can be adopted, including the use of a compressing member, a spring or some other suitable device for holding phosphor sheets between the holding members and the rotating body, as well as the application of suction.

Figure 2B:
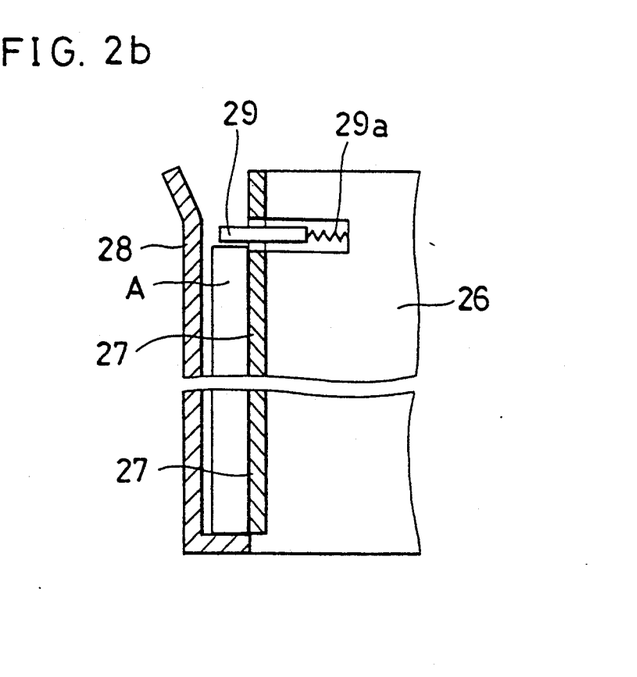
FIG. 2b is a partial cross-sectional view showing an embodiment of the fixing means for the holding means of the high-speed imaging stage according to the present invention.

For example, as shown in FIG. 2b, the fixing device is a pin 29 which is projected with the spring 29a from the thin lead plate 27 to the space between the holding member 28 and the thin lead plate 27 when the phosphor sheet A is held. When the phosphor sheet A is inserted into the space and detached from it, the pin 29 is depressed into the rotating body 26 with a magnet (not shown).

The accommodating device 20 is installed within the housing 11 in its lower right position and it allows the phosphor sheets A to be accommodated in the receiving magazine 38 after the end of imaging cycle.

The accommodating device 20 is composed of a guide member 40 with which a phosphor sheet A dropping from the holding device 16 is guided toward the receiving magazine 38, a suction member 42 for causing the phosphor sheet A to be accommodated into the receiving magazine 38 in a predetermined position, and a drive (not shown) for moving the suction member 42. Except for the addition of the guide member 40, the accommodating device 20 has essentially the same construction as the aforementioned supply device 18 and, hence, need not be described here in detail.

Having the basic structure described above, the high-speed imaging stage 10 is operated as follows for imaging purposes.

First, the supply magazine 22 accommodating yet to be imaged phosphor sheets A is loaded in the housing in a predetermined position. Then, the suction member 24 of the supply device 18 is moved so that phosphor sheet A-1 is inserted into the space defined between the holding member 28 and the rotating body 26 (this space is hereunder referred to as "the space formed by the holding member") and fixed in position by a fixing device (not shown).

When the phosphor sheet A-1 is completely set, the controller allows the holding device 16 (in particular, the rotating body 26) to rotate at low speed through 90° in the direction of arrow a until the holding member 30 comes to the lowest position. Subsequently, the suction member 24 moves so that phosphor sheet A-2 is inserted into the space formed by the holding member 30, with sheet A-2 being then fixed in position.

When the holding device 16 repeats the low-speed rotation and stop movements in the manner described above, phosphor sheet A-3 is inserted into the space formed by the holding member 32 and phosphor sheet A-4 is inserted into the space formed by the holding member 34, with the respective phosphor sheets being then fixed in position.

When the four phosphor sheets A-1 to A-4 are set in their respective positions, they are ready for imaging. In the case shown in FIG. 1, the phosphor sheet A-3 faces the imaging window 14a in the bed 14 in the first step of imaging cycle and, upon illumination with radiation L from the radiation source 23, the radiation image of the subject 12 is first recorded on the phosphor sheet A-3.

When the imaging of the phosphor sheet 3 ends, the holding device 16 makes a fast rotation through 90° in the direction of arrow a, whereby the phosphor sheet A-4 comes to a position where it faces the imaging window 14a. Then, radiation L is applied in the same manner as described above and imaging is performed on the phosphor sheet A-4.

When the imaging of the phosphor sheet A-4 ends, the holding device 16 is rotated again through 90° and imaging is performed on the phosphor sheet A-1 in the same manner as described above. Finally, phosphor sheet A-2 is imaged in the same manner, whereby continuous imaging of the subject 12 on the four phosphor sheets A is completed.

When the imaging cycle ends, the step of detaching the phosphor sheets A from the holding device 16 is started. At the time when the imaging cycle has ended, the phosphor sheet A-3 is in such a position that it faces the accommodating device 20, so by releasing the means of fixing the holding member 30, the phosphor sheet A falls on its own weight and slides down the guide member 40 to enter the receiving magazine 38. Subsequently, the suction device 42 of the accommodating device 20 moves in such a way that the phosphor sheet A-3 is accommodated in the receiving magazine 38 in a predetermined position.

When the phosphor sheet A-3 is properly accommodated in the receiving magazine 38, the holding device 16 rotates at low speed through 90° in the direction of arrow a so that the phosphor sheet A-4 comes to a position where it faces the accommodating device 20; subsequently, the phosphor sheet A-4 is accommodated in the receiving magazine 38 in a predetermined position by the same procedure as described above.

In a similar manner, the other phosphor sheets A-1 and A-2 are accommodated into the receiving magazine 38, whereby the whole process of imaging cycles is completed.

In the example described above, the holding device 16 is in the form of a square prism and is capable of loading up to four phosphor sheets A. It should, however, be noted that this is not the sole case of the present invention and the holding device 16 may be in the form of a triangular prism which is capable of loading, up to three phosphor sheets A. If desired, the holding device 16 may be in the form of pentagonal and other polygonal prisms which are capable of loading five or more phosphor sheets A.

Another modification may be directed to the method of supplying phosphor sheets A to the holding device 16 by the supply device 18. Stated more specifically, the holding device 16 may be rotated through 45° in the direction of arrow a from the position shown in FIG. 1, whereby phosphor sheets A can slide due to its own weight.

Figure 3:
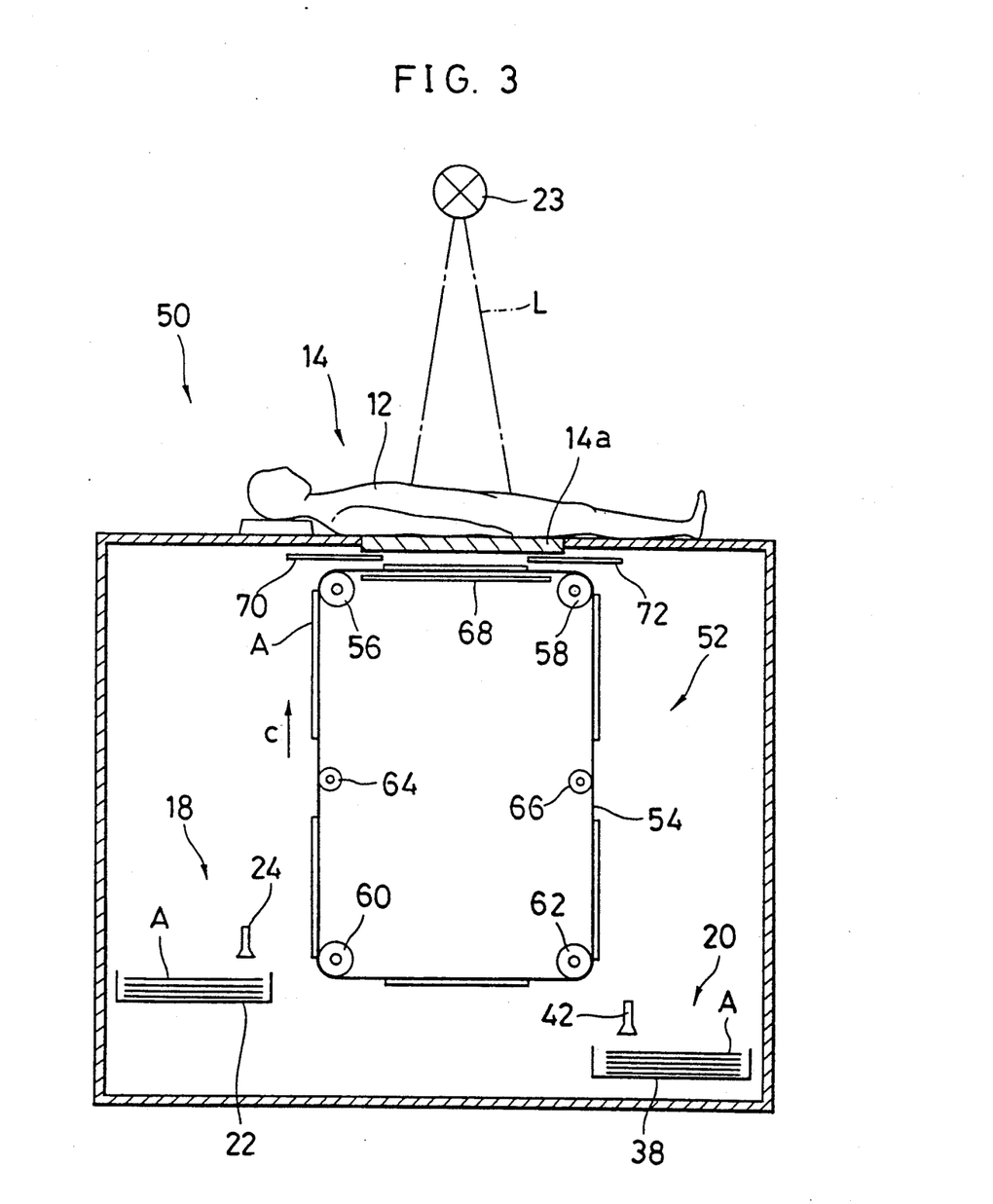
FIG. 3 is a diagrammatic cross-sectional view showing other embodiment of the high-speed imaging stage according to the first aspect of the present invention.

FIG. 3 is a diagrammatic cross-sectional view showing another embodiment of the high-speed imaging stage according to the present invention.

The high-speed imaging stage 10 shown in FIG. 1 has the holding device 16 which is the form of a prism such as a square prism. In the high-speed imaging stage generally indicated by 50 in FIG. 3, a holding device 52 in the form of an endless belt 54 is used. Except for this point, the high-speed imaging stage 50 has essentially the same construction as the imaging stage 10 shown in FIG. 1, so similar components are identified by like numerals and will not be described below in detail.

As shown in FIG. 3, the holding device 52 is composed basically of the endless belt 54 and rollers 56, 58, 60 and 62 onto which it is wound. An auxiliary roller 64 is provided between rollers 56 and 60, and another auxiliary roller 66 is provided between rollers 58 and 62.

A lead plate 68 is provided in the upper part of the closed space defined by the endless belt 54 (in the area between rollers 56 and 58). At the same time, lead plates 70 and 72 are provided in all areas above the holding means 52 except where radiation L passes. The purpose of those lead plates is to insure that only the phosphor sheet A that faces the bed 14 will be exposed to radiation L.

In the high-speed imaging stage 10 shown in FIG. 1, the phosphor sheet A is supplied to the imaging position (i.e., where it faces the imaging window 14a) and ejected therefrom by rotating the holding device 16. In contrast, the holding device 52 shown in FIG. 3 is moved as the endless belt 54 rotates in the direction of arrow a. Therefore, the phosphor sheets A are supplied to the imaging position and ejected therefrom by repeating the process of rotating the endless belt 54 at high speed and bringing it to a temporary stop.

The holding device 52 has a rotational drive source connected to either one of rollers 56, 58, 60 and 62. The other rollers may be adapted to rotate freely. However, as already mentioned, the high-speed imaging stage 50 of the present invention is so designed as to perform high-speed continuous imaging of the subject 12 on phosphor sheets A which are supplied to the imaging position and ejected from it by repeating the high-speed rotation and abrupt stop of the endless belt 54. Hence, in order to insure that the endless belt 54 can be quickly rotated and brought to a sudden stop in a precise manner, a transmission device such as the combination of pulleys and belts is preferably used so that the rollers other than the drive roller will rotate as followers which receive motion from the drive roller or they will rotate synchronously with the drive roller.

The endless belt 54 wound onto the four rollers 56, 58, 60 and 62 supports up to six phosphor sheets A and rotates in the direction of arrow c. During the imaging of the subject 12 on the high-speed imaging stage 50, phosphor sheets A are supplied to the position where they face the imaging window 14a and ejected from that position by repeating the rapid rotation and abrupt stop of the endless belt 54.

There is no particular limitation on the device for supporting phosphor sheets on the endless belt 54 and various methods can be adopted, including the provision of a belt element at both ends in a direction perpendicular to the rotation of the endless belt 54 so that a phosphor sheet is held between those belt elements and the endless belt 54, as well as the provision of various kinds of engaging members.

Figure 4A:
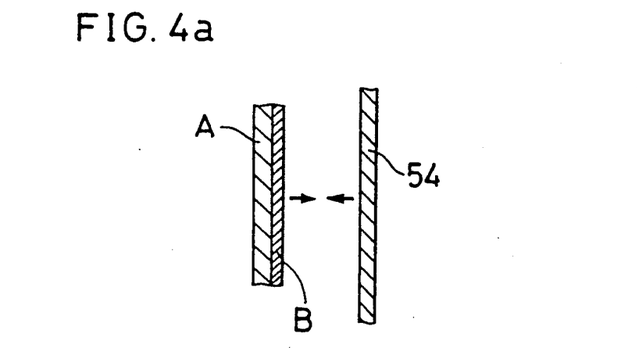
FIGS. 4a, 4b and 4c are diagrammatic cross-sectional views showing other embodiment of the phosphor sheet fixing means for the holding means of the high-speed imaging stage according to the present invention, respectively.
Figure 4B:
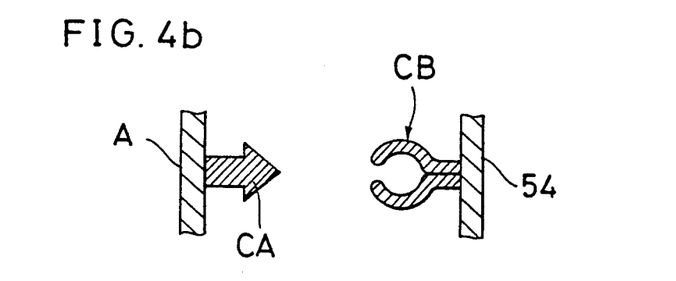
Figure 4C:
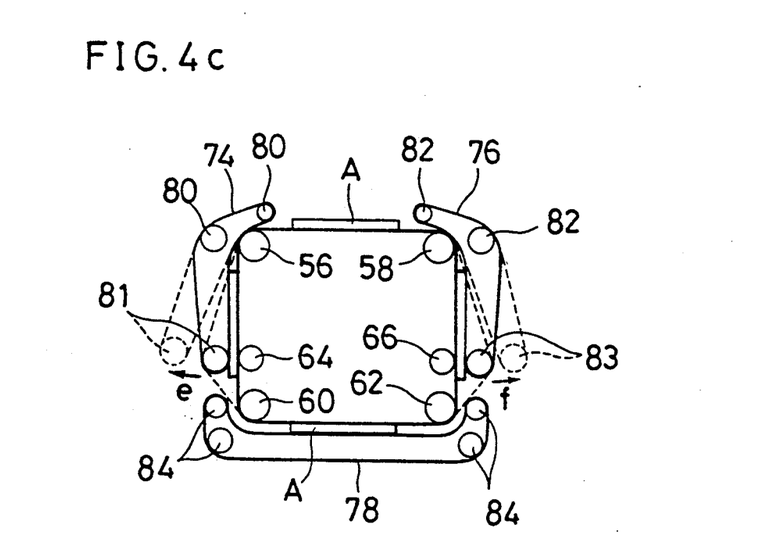

For example, a device for supporting phosphor sheet A is shown in FIGS. 4a, 4b and 4c as a preferable embodiment thereof.

In the embodiment shown in FIG. 4a, the back of the phosphor sheet A is made of magnetic material or the magnetic material sheet is affixed on the back of the phosphor sheet A, and electro-magnets are provided to the part or all of the endlessbelt 54. Thus, the phosphor sheet A is supported securely on the surface of the endlessbelt 54 by the magnetic force.

In the embodiment shown in FIG. 4b, at least one projection CA is provided to the back of the phosphor sheet A and pinching members CB which pinch the projection CA of the sheet A are provided on the surface of the endlessbelt 54. Thus, the phosphor sheet A is supported securely on the surface of the endlessbelt 54. In the embodiment shown in FIG. 4c, nip-endlessbelts 74, 76, 78 are provided to both sides and the bottom of the endlessbelt 54. The nip-endlessbelts 74 and 76 are placed under tension about three rollers 80, 80, 81 and 82, 82, 83. The nip-endlessbelt 78 of the bottom is placed under tension about four rollers 84, 84, 84, 84. The four phosphor sheets are provided to this holding device 52 16 shown in FIG. 4c. When the phosphor sheet A is inserted into the space between the endlessbelt 54 and the nip-endlessbelt 74, the rollers 81 and 64 are able to move up to the position shown by dashed lines in the direction of arrow e as shown in FIG. 4c. When the sheet A is detached from the space between the endlessbelt 54 and nip-endlessbelt 76, the rollers 83 and 66 are able to move up to the position shown by dashed lines in the direction of fa as shown in FIG. 4c.

The operation of the high-speed imaging stage 50 is described below. While the holding device 52 in the imaging stage 50 uses the endless belt 54 as the key component, the imaging stage 50 operates in essentially the same way as the high-speed imaging stage 10 shown in FIG. 1 which uses the holding device 16 of a prismatic shape: a predetermined number of phosphor sheets A are supplied to the holding device 52 by the supply device 18; after supporting and fixing them, the rotation and stop of the holding device 52 (in particular, the endless belt 54) is repeated to perform imaging on the supported phosphor sheets A; and after the end of imaging on all phosphor sheets A, they are accommodated into the receiving magazine 38 by the accommodating device 20.

Stated more specifically, the supply magazine 22 containing yet to be imaged phosphor sheets A is first set in the housing in a predetermined position. Then, a predetermined number of phosphor sheets A is supplied onto the endless belt 54 in the holding device 52 by the supply device 18. In this case, a first phosphor sheet A is supplied to a position that corresponds to the lower left surface of the loop defined by the endless belt 54 (in the following description, the words "the loop defined by" will be omitted), so when a single phosphor sheet A is supplied and fixed in that position, the endless belt 54 is rotated by a predetermined amount in the direction of arrow c and the next phosphor sheet A is loaded on the endless belt 54.

By repeating that procedure, a plurality of phosphor sheets A, e.g., six sheets, are supported on the endless belt 54 and they are now ready for starting an imaging process. First, radiation L is issued from the radiation source 23 and imaging is performed on the phosphor sheet A that is positioned in a face-to-face relationship with the imaging window 14a in the bed 14, namely, the phosphor sheet A that lies on the topmost part of the endless belt 54. When the imaging of that phosphor sheet A ends, the endless belt 54 starts to rotate at high speed in the direction of arrow c until the phosphor sheet A next to the first phosphor sheet A in the direction of rotation comes to a position where it faces the imaging window 14a, whereupon the endless belt stops rotating and imaging is performed on the second phosphor sheet A. When the imaging of the second phosphor sheet A ends, the endless belt 54 starts again to rotate and, in the same manner as described above, the next phosphor sheet A stops in a position where it faces the imaging window 14a. By repeating these procedures with the high-speed imaging stage 50 shown in FIG. 3, the subject 12 is continuously imaged at high speed on a total of six phosphor sheets A.

After the continuous imaging on the six phosphor sheets A ends, the rotation and stop of the endless belt 54 is repeated as in the case of supplying those phosphor sheets, so that they are detached from the endless belt 54 and accommodated in the receiving magazine 38 by the accommodating device 20.

In the high-speed imaging stage 50 shown in FIG. 3, the endless belt 54 is capable of supporting six phosphor sheets but this is not the sole case of the present invention and the number of phosphor sheets that can be supported by the endless belt at a time may be of any number that can be physically accommodated.

By following the above-described procedure of operating the high-speed imaging stage according to the first embodiment of the present invention, continuous imaging of a predetermined number of phosphor sheets can be performed at a very high speed depending upon the rotational speed of the holding device which may be in the form of a prism or an endless belt and this enables the state of blood circulation or other phenomena to be examined in an accurate manner. In the high-speed imaging stage, phosphor sheets are supplied to the imaging position and ejected therefrom by rotating the holding device at high speed, so high-speed continuous imaging can be accomplished without damaging the phosphor sheets even if they are placed individually in protective cases or some other suitable enclosures.

Needless to say, the first embodiment of the present invention is not limited to the case where the holding device is loaded with as many phosphor sheets as can be loaded for imaging and only the phosphor sheets that need be imaged may be loaded in the holding device.

On the pages that follow, we describe in detail the high-speed imaging stage according to the another embodiment of the present invention.

In, the high-speed imaging stage according to the first embodiment of the present invention which has been discussed on the previous pages, a predetermined number of phosphor sheets are supported on the holding device and thereafter subjected to continuous imaging, followed by ejection of the imaged phosphor sheets into a receiving container. In the second embodiment of the present invention, one phosphor sheet is subjected to imaging while, at the same time, another phosphor sheet that is yet to be imaged is supplied to the holding device and/or a phosphor sheet that has already been imaged is accommodated into a receiving container.

The high-speed imaging stage according to the second embodiment of the present invention is described below with reference to FIGS. 5a and 5b. The basic structure for this imaging stage is essentially the same as the imaging stage of the first embodiment except for the way in which the operation of the holding device, supply device and accommodating means is controlled. Therefore, the same components are identified by like numerals and will not be described in detail. Accordingly, the following description centers on the imaging operation of the stage.

Figure 5A:
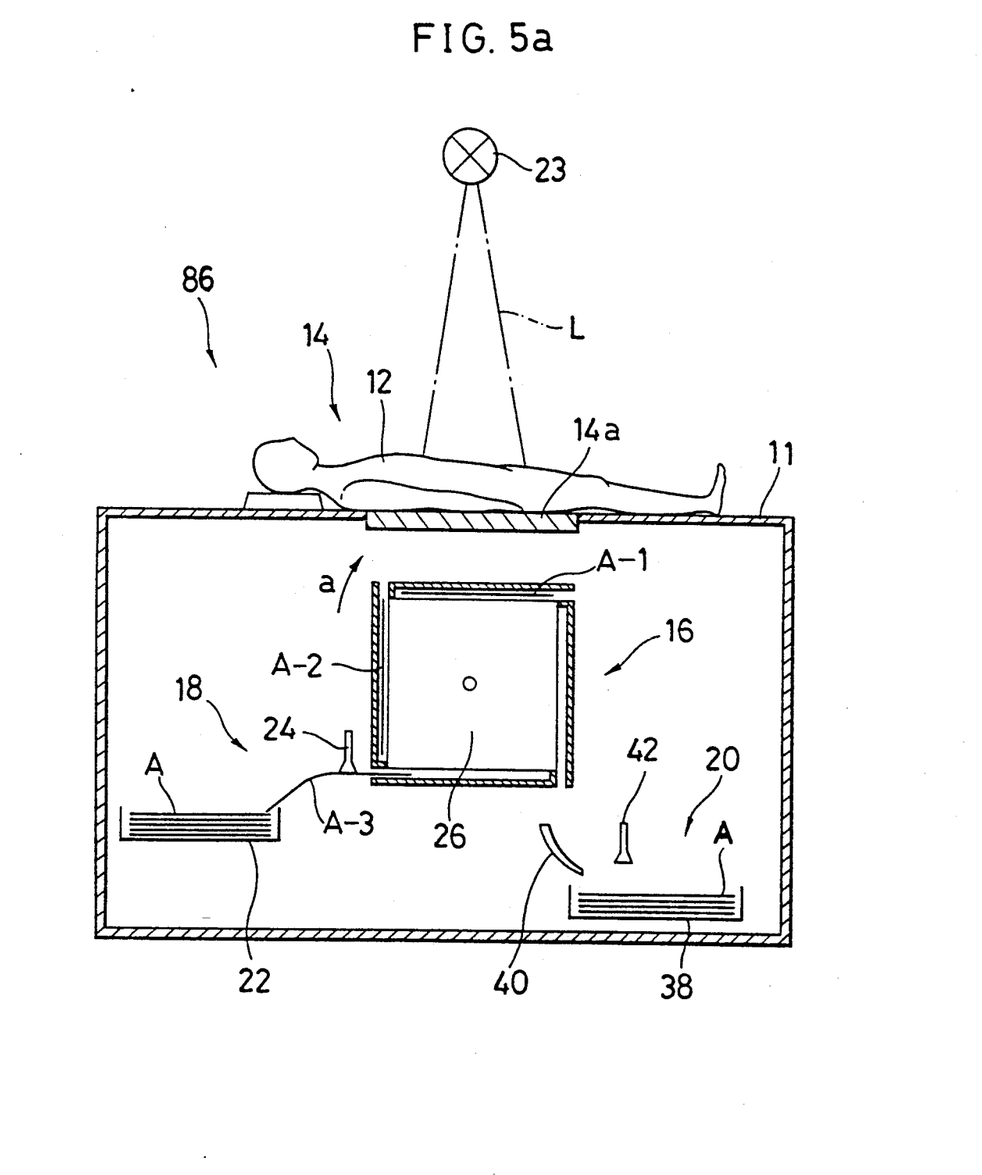
FIGS. 5a and 5b are diagrammatic cross-sectional views showing the high-speed imaging stage according to the second aspect of the present invention together with the manner in which it is operated.
Figure 5B:
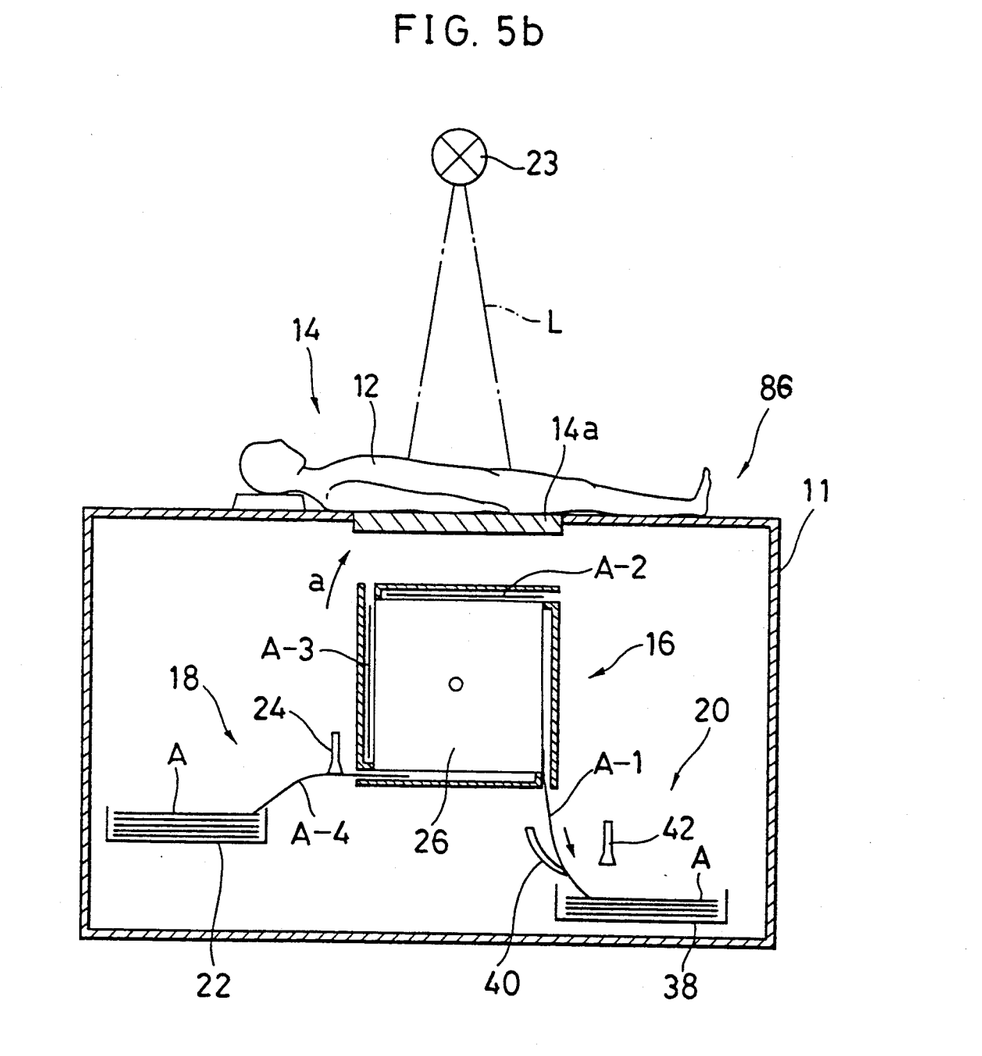

To operate the high-speed imaging stage which is generally indicated by 86 in FIGS. 5a and 5b, the supply magazine 22 is first set in the housing 11 in a predetermined position. Then, the supply device 18 is driven and the holding device 16 is rotated in the direction of arrow a, whereby phosphor sheets A-1 and A-2 are supported on the holding device 16 in the same manner as in the first aspect of the present invention. With these steps taken, phosphor sheet A-1 is located in a position where it faces the imaging window 14a in the bed 14 as shown in FIG. 5a.

As in the first embodiment, the subject 12 is then imaged onto the phosphor sheet A-1 but what is characteristic of the second embodiment of the present invention is that in synchronism with this imaging step, the supply device 18 is driven so that the phosphor sheet A-3 is supplied from the supply magazine 22 onto the holding device 16 and held there as shown in FIG. 5a.

When the imaging on the phosphor sheet A-1 as well as the supply and holding of the phosphor sheet A-3 have ended, the holding device 16 rotates through 90° and the phosphor sheet A-2 comes to a position where it faces the bed 14 as shown in FIG. 5b. Imaging is then performed on the phosphor sheet A-2 and, at the same time, the yet to be recorded phosphor sheet A-4 is supplied from the supply magazine 22 to the holding device 16 by the supply device 18; in addition, the already imaged phosphor sheet A-1 is simultaneously disengaged from the holding device 16 and accommodated into the receiving magazine 38 by the accommodating device 20.

When the imaging of the phosphor sheet A-2, the supply of the phosphor sheet A-4, as well as the ejection and accommodation of the phosphor sheet A-1 have ended, the holding device 16 further rotates through 90° in the direction of arrow a and imaging is performed on the phosphor sheet A-3 in the same manner as shown in FIG. 5a while, at the same time, the phosphor sheet A-2 which has passed through the imaging step is detached from the holding device 16 and accommodated into the receiving magazine 38. In addition, a yet to be imaged phosphor sheet is supplied into the space which has so far been filled with the phosphor sheet A-1.

With the above-described high-speed imaging stage according to the second embodiment of the present invention, the imaging time itself is not as short as in the first embodiment and yet it is possible to perform rapid and continuous imaging on a large number of phosphor sheets without damaging them even if they are not placed in individual protective cases.

In the example shown in FIGS. 5a and 5b, a prismatic rotating body is used as the holding device but this is not the sole case of the second embodiment of the present invention and an endless belt may be substituted as in the case of the high-speed imaging stage 50 shown in FIG. 3.

In the high-speed imaging stage 10 shown in FIG. 1 and in the high-speed imaging stage 86 shown in FIG. 5a, the rotating body 26 is used as the holding device 16. In imaging stages of this type, a space must be provided for permitting the rotation of the rotating body and this unavoidably increases the distance that occurs between the subject 12 and the recording material A during imaging. To deal with this problem, a high-speed imaging stage of the type indicated by 88 in FIG. 6 may be used. In that imaging stage, the rotating body 26 (in particular, the holding device 16) is movable vertically in the direction of arrow d so that when rotation is necessary, the rotating body 26 is lowered to the position where it can be rotated (see FIGS. 1, 5a and 5b) while, in the imaging step, it is lifted to come closer to the imaging window 14a as shown in FIG. 6 so as to achieve the recording of a sharper image.

Figure 6:
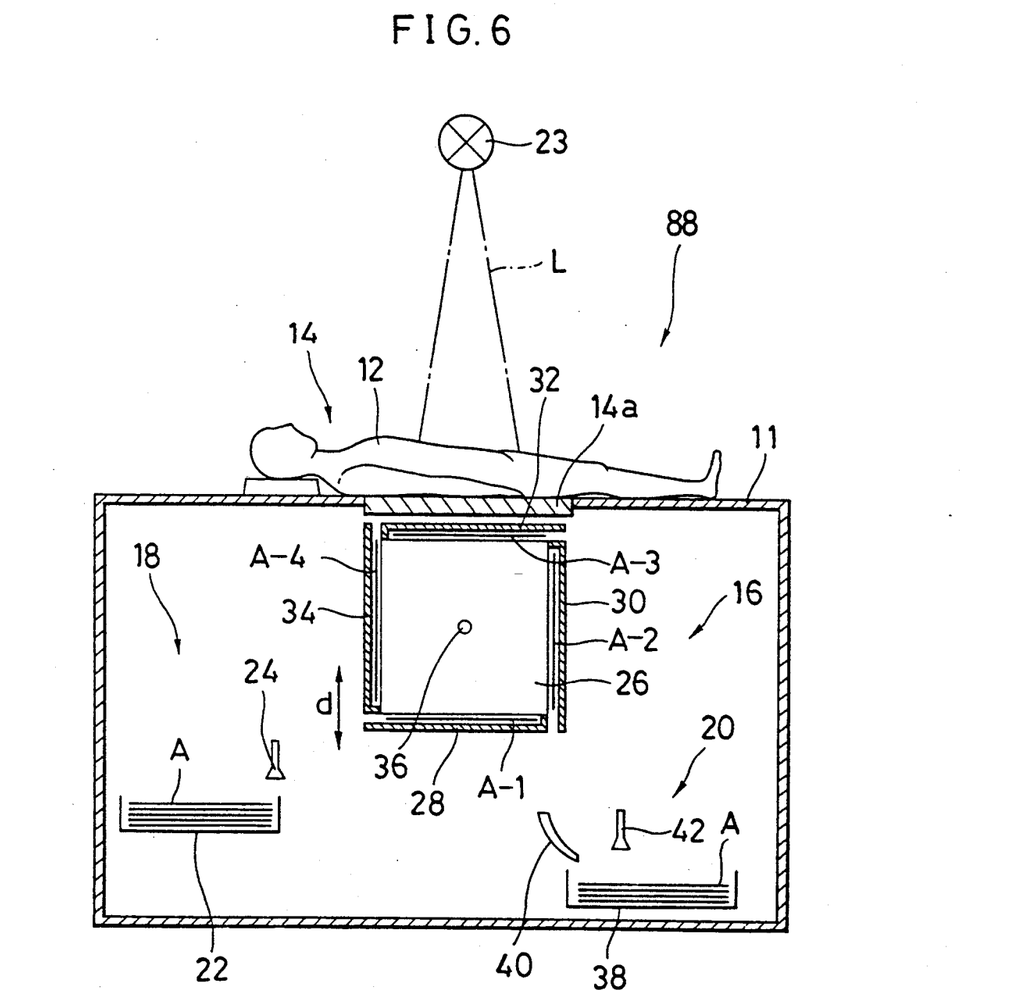
FIG. 6 is a diagrammatic cross-sectional view showing other embodiment of the high-speed imaging stage of the present invention.

To adjust the distance to the imaging window 14a, the rotating body 26 need not be made movable vertically in the direction of arrow d as shown in FIG. 6. If desired, the rotating body 26 may be movable at an angle in such a way that it approaches or departs from the imaging window 14a(or subject 12).

The method of adjusting the distance between the rotating body 26 and the subject 12 is not limited in any particular way and any known means such as one using a link mechanism, rack-and-pinion or hydraulic actuator may be adopted.

Figure 7:
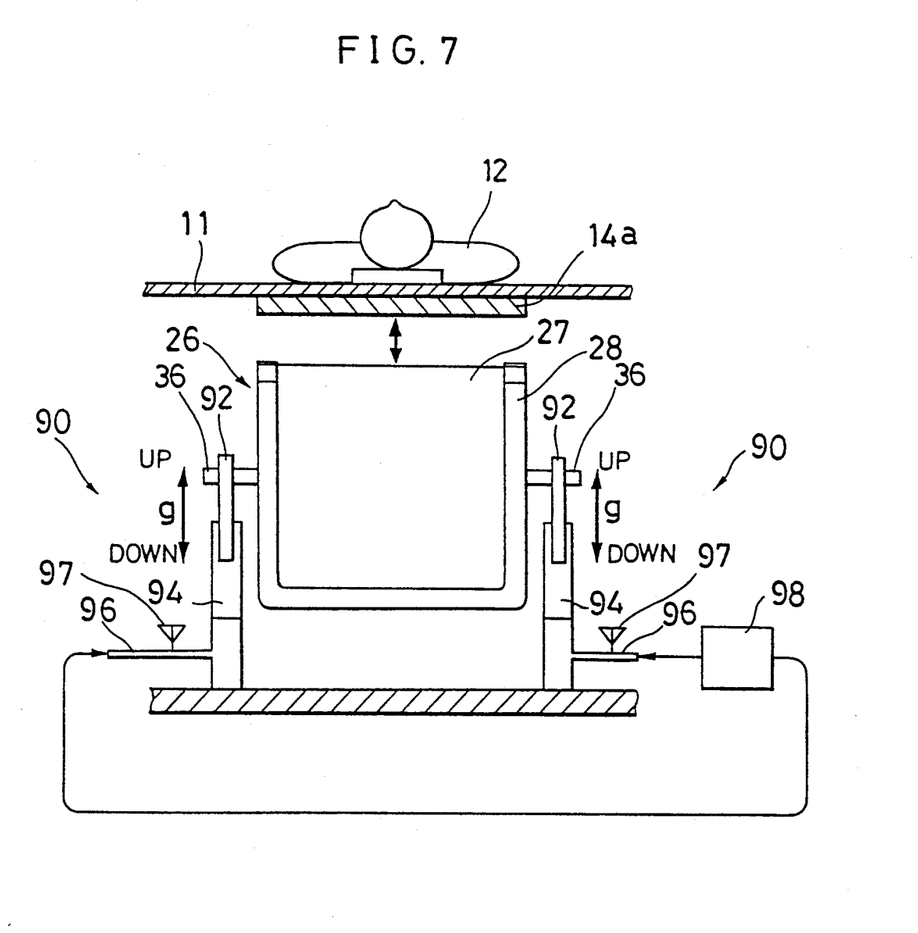
FIG. 7 is a cross-sectional view showing other embodiment of the high-speed imaging stage according to the present invention.

For example, as shown in FIG. 7, the rotating body 26 can be moved up and down by hydraulic actuators 90, 90. The hydraulic actuators 90, 90 are composed of piston rods 92, 92 which supports both edges of the rotating shaft 36, hydraulic cylinders 94, 94, oil pipes 96, 96, exhaust valves 97, 97 and a oil pump 98.

In the high-speed imaging stages according to the first and second embodiments of the present invention, the holding device makes rotary movements to allow phosphor sheets to be supplied to the imaging position and ejected therefrom. However, this is not the sole case of the present invention and the holding device may be in a linear form such as a plate, which is made slidable so that phosphor sheets are ejected from the imaging position and supplied thereto.

The foregoing description is directed to the case of performing imaging on stimulable phosphor sheets but this is not the sole of case of the present invention and the high-speed imaging stages described above are also applicable to various other recording materials including X-ray films.

While the high-speed imaging stage of the present invention has been described above in detail with particular reference to the preferred embodiments, it should be understood that the present invention is by no means limited to those preferred embodiments and that various improvements and modifications can be made without departing from the spirit and scope of the invention.

In summary, by using the high-speed imaging stage of the present invention, high-speed and continuous imaging can be accomplished in an easy and efficient manner without damaging the recording materials even if they are not placed individually within protective cases or the like and all that is needed is to set a magazine or some other supply container that accommodates a number of recording materials such as phosphor sheets.

The high-speed imaging stage according to the first embodiment of the present invention has the particular advantage that continuous imaging on a given number of recording materials can be performed in a very fast and easy way. With the high-speed imaging stage according to the second embodiment of the present invention, the imaging time itself is not as short as in the first aspect but the sequence of operations that comprise the steps of supplying recording materials from a supply container, setting each recording material on the holding device, recording the image of a subject and accommodating the imaged recording material into a receiving container can be carried out in a rapid way and, therefore, continuous imaging on a large number of recording materials can be accomplished at high speed and in an easy manner.

What is claimed is:

1. A high-speed imaging stage comprising:
   a bed having an image window formed therein at a position corresponding to an image site of a subject, said image window being adapted to allow radiation that has penetrated a subject to pass therethrough;
   a polygonal holding device rotationally mounted about an axis thereof;
   a frame provided on each side of said holding device, said frame having an open portion through which a recording material may be inserted into said frame so as to removably fix a recording material to said sides of said holding device;
   an engagement device configured so as to selectively obstruct said open portion so as to hold the recording material in said frame when said engagement device is in a first position and to allow a recording material to freely pass through said open portion when said engagement device is in a second position;
   means for intermittently rotating said holding device about said axis so as to cause each of said frames to be successively positioned in opposition to a loading position at said image window whereby a radiation image of the subject can be recorded on the recording materials, and an unloading position;
   a supply device, operatively coupled to said engagement device so as to operate in concert therewith, disposed opposite the frame which is in the loading position so as to insert a recording material therein through said one portion of said frame;
   an accommodating device, operatively coupled to said engagement device so as to operate in concert therewith, disposed opposite the frame which is in the unloading position so as to detach the recording material contained therein, through said open portion of said frame, to a receiving container after an image has been recorded thereon, a controller coupled to said rotating means so as to selectively cause said holding device to rotate at a first speed or at a second speed, which is slower than said first speed;

said controller causing said holding device to intermittently rotate at said second speed, while simultaneously activating said supply device and causing said engagement device to assume said second position, so as to insert said recording materials into said frames while holding device intermittently rotates;

said controller causing said holding device to intermittently rotate at said first speed, while causing said engagement device to assume said first position, so as to record a radiation image of the subject on the recording materials while said holding device intermittently rotates; and said controller causing said holding device to intermittently rotate at said second speed after a desired number of said recording materials have had a radiation image recorded thereon, while simultaneously activating said accommodating device, and causing said engagement device to assume said second position, so as to detach said recording materials and transfer them to said receiving container while said holding device intermittently rotates.

2. A high-speed imaging stage according to claim 1 wherein said holding device is moveable with respect to said imaging window in such a way that, when imaging is to be performed, said holding device is moved so as to reduce the distance between the recording material to be imaged and said imaging window.

3. A high-speed imaging stage comprising:
a bed having an image window formed therein at a position corresponding to an image site of a subject, said image window being adapted to allow radiation that has penetrated the subject to pass therethrough;

a polygonal holding device rotationally mounted about an axis thereof;

a frame provided on each side of said holding device, said frames having an open portion through which a recording material may be inserted into said frames so as to removably fix the recording material to said sides of said holding device;

an engagement device configured so as to selectively obstruct said open portion so as to hold the recording material in said frame when said engagement device is in a first position and to allow the recording material to freely pass through said open portion when said engagement device is in a second position;

means for intermittently rotating said holding device about said axis so as to cause each of said frames to be successively positioned in opposition to a loading position at said image window whereby a radiation image of the subject can be recorded on the recording materials, and an unloading position;

a supply device, operatively coupled to said engagement device so as to operate in concert therewith, disposed opposite the frame which is in the loading position so as to insert a recording material therein through said open portion of said frame; and an accommodating device, operatively coupled to said engagement device so as to operate in concert therewith, disposed opposite the frame which is in the unloading position so as to detach the recording material contained therein and transfer it through said open portion of said frame, to a receiving container after an image has been recorded thereon.

4. A high-speed imaging stage according to claim 3 wherein said holding device is moveable with respect to said imaging window in such a way that, when imaging is to be performed, said holding device is moved so as to reduce the distance between the recording material to be imaged and said imaging window.

* * * * *